June 15, 1965 W. F. BEAUSOLEIL ETAL 3,189,872

DATA HANDLING MECHANISM

Filed March 20, 1962 2 Sheets-Sheet 1

INVENTORS
WILLIAM F. BEAUSOLEIL
DOMINICK J. GALAGE

BY Carl C. Kling

ATTORNEY

June 15, 1965 W. F. BEAUSOLEIL ETAL 3,189,872

DATA HANDLING MECHANISM

Filed March 20, 1962 2 Sheets-Sheet 2

United States Patent Office 3,189,872

Patented June 15, 1965

3,189,872

DATA HANDLING MECHANISM

William F. Beausoleil, Poughkeepsie, and Dominick J. Galage, Newburgh, N.Y., assignors to International Business Machines Corporation, New York, N.Y., a corporation of New York Filed Mar. 20, 1962, Ser. No. 181,027

3 Claims. (Cl. 340—146.1)

Figure 1A:
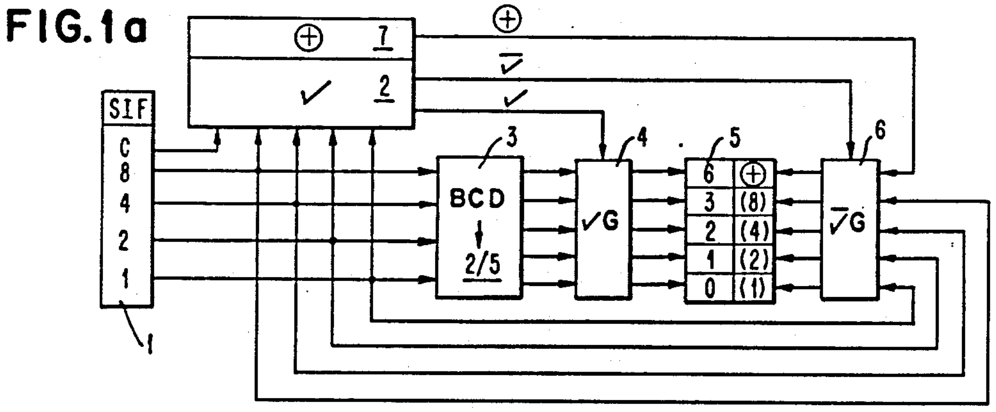

The invention relates to digital data transmission and more particularly to error handling mechanism associated with code translation mechanism.

Digital data processors, being constructed of high quality electronic devices which have proved quite reliable, have a very low error rate. Digital data processors, however, generally require large quantities of input and output data from electromechanical bulk storage devices such as magnetic tape units. Mechanical problems associated with tape handling and reading cause a number of tape reading errors which, although small, can cause significant errors in the arithmetic calculations. Because of the possibility of error, it is common for magnetic tape units to include in each data reading group a parity bit which gives an indication of any single error within the reading group.

Magnetic tape units mechanically drive their tapes past a reading head which effectively presents for reading purposes a line contact across the tape. The smallest item of electromagnetic storage on the tape is called a bit. The bits making up a reading group are arranged transversely across the tape so that all the bits cross the reading line simultaneously. Simultaneity may be electronically enforced by skew circuitry. Bit channels on the tape are arranged lengthwise to the tape and the bits located in a particular channel generally have the same bit weight. The preferred embodiment of the invention operates well with a tape having eight data channels and at least one parity channel. The data channels are assigned values or weights so that various combinations of bits make up various characters.

In numeric mode, the eight data channels are assigned bit weights 8421 8421 and the parity channel is called C. Two numeric digits in BCD code thus are handled as one reading group. Bit weights add to provide value. For example, numeric 9–4 is $8\overline{42}1$ (8 bit and 1 bit)–$\overline{8}4\overline{21}$ (4-bit).

The parity bit in any correct reading group is of a value to make odd the total number of bits in the group.

In alphameric mode, the data channels are assigned weights Y, X, B, A, 8, 4, 2, 1 and the parity channel is called C. A numeric character is alphameric mode is made up of an appropriate combination of bits. For example, numeric 6 is $\overline{8}42\overline{1}$ (4 bit and 2 bit) and numeric 7 is $\overline{8}421$ (4 bit, 2 bit, and 1 bit). Alphabetic characters include a numeric portion and an A bit, a B bit or both A and B bits. The X and Y bits identify alphameric mode by their coincidence, since in numeric mode they would indicate the 8–4 combination, an impossible BCD digit.

The tape unit connects to the error handling mechanism via a standard interface which, for the purposes of this invention, includes connections for a full set of data channels and a parity channel. Two mode control channels may be included. The data channels and parity channel connect to a parity checker which identifies tape reading groups in error. The operation of the standard interface is such that it may be thought of a register which originates signals for use by the data handling mechanism.

The relative likelihood of a tape error is great enough to require error handling provision. Most tape errors, however, are not correctible by simple automatic means but are often easily correctible by a human operator. For example, in a list of names in alphabetic order (Aaron, Abel, Ace, A*kerman, Acre) there is a parity error in the name A*kerman which is detectable by a parity monitor (the * indicates a parity error in this example). By analyzing the context, the human operator has no trouble in telling that the proper name is Ackerman. He can make corrections rather simply by manipulating the computer console. In certain other parity error situations, the operator is much aided by analyzing the bit structure of the error character. The bit structure of the C, for example, is CAB21. The operator suspects a single error since multiple errors are relatively rare.

The most common error is "dropping a bit;" assume that the 1 bit has been dropped so that the resulting bit structure is CAB2. The error could not have been dropping of the 8 bit because the 8 bit does not coexist with the 2 bit. The error could have been dropping of the 4 bit, in which case the parity error character (CAB42) would have been "F." AFkerman however is not a common name. The error could have been dropping of the 1 bit, in which case the bit structure would have been CBA21 or "C." ACkerman seem to fit properly in the context and is a reasonable name. The error could also have been the picking up of the C bit, the B bit, the A bit, or the 2 bit, in which cases the corrected bit structure and name are as follows:

CBA—A&kerman
BA2—ABkerman
CA2—ASkerman
CB2—AKkerman

Code translation commonly occurs between a tape unit and the computer which it serves. It is advantageous to the programer to have easy access to the exact bit structure of the reading group in error, without translation which might obscure hints necessary for correction. The bit structure in error must also not be in a form valid in the receiving code, or it might then masquerade as a valid new code character and cause trouble.

*Objects*

Objects of the invention are:

(1) To pass correct reading groups through a code translator to a receiving utilization device with proper validity for the utilization device in response to a parity check but to pass the original error reading group to the receiving device if there is a parity no-check, and to ensure that the no-check reading group contains an error characteristic in the code of the utilization device.

(2) To receive incoming reading groups in 8421 parity code and translate proper reading groups to 2/5 code while passing error reading groups unchanged so far as the 8421 bits are concerned but producing a new parity bit on the 8421 bits which ensures an invalid 2/5 code result.

*Features*

The invention features a parity BCD code to 2/5 code translator to pass proper reading groups toward a utilization device and a straight BCD bypass for error reading groups with an odd parity generator on the BCD channels connected to a 2/5 channel to ensure that the error reading groups in their original bit pattern (amended by the generated parity) pass to a utilization device but fail 2/5 validity checks. Odd parity will be either 1/5, 3/5 or 5/5, all invalid in 2/5 code. The original bit structure in BCD code is thus available to the utilization device but in a form recognizable as invalid so that the utilization device will not accept a fortuitous 2/5 result.

*Advantages*

The data handling mechanism can transmit and translate proper reading groups, and without delay and at minimal cost transmit the original bit structure of error reading groups in a form which is detectable as invalid in 2/5 code.

The foregoing and other objects, features and advantages of the invention will be apparent from the following more particular description of a preferred embodiment as illustrated in the accompanying drawings.

FIGURE 1*a* is a block diagram of the invention.

Figure 1B:
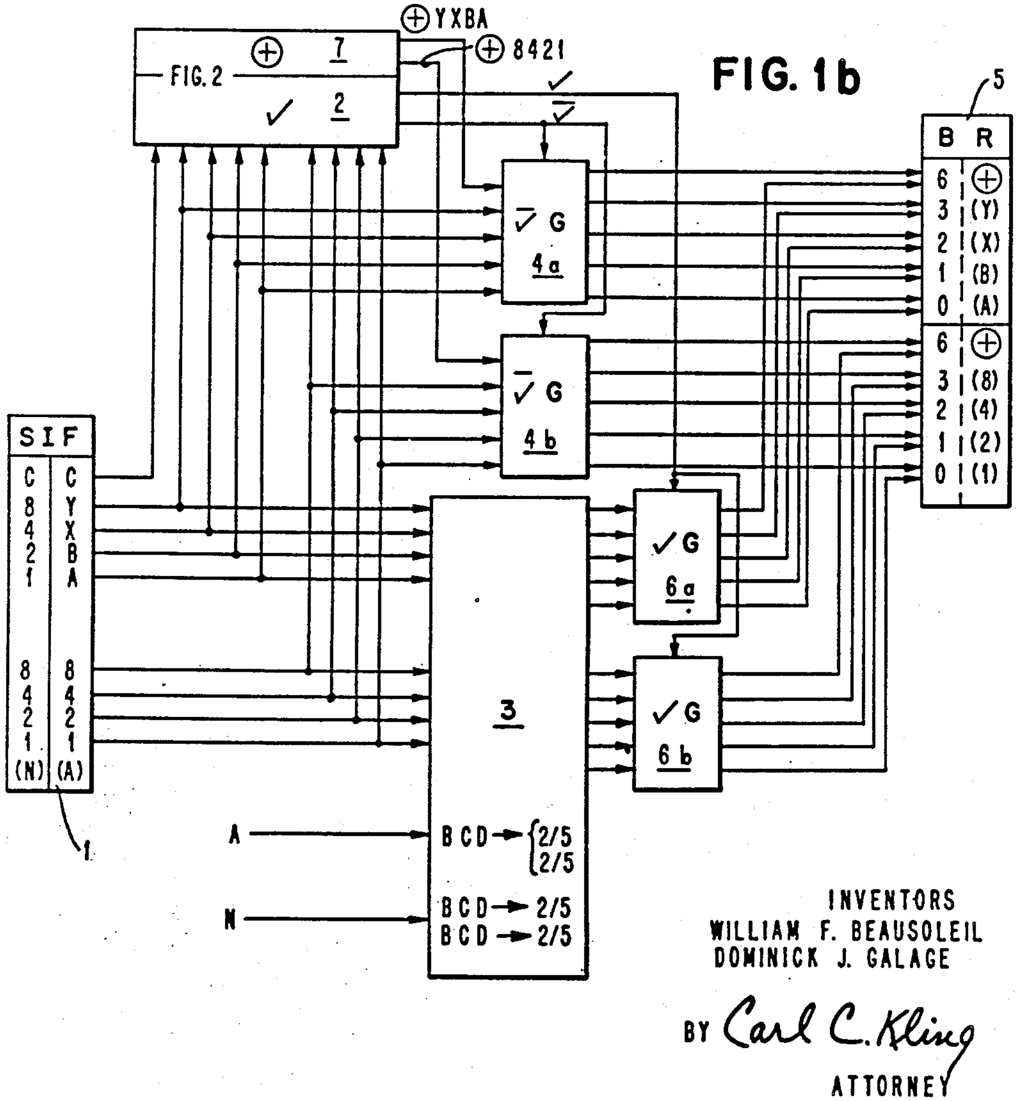

FIGURE 1*b* is a block diagram of a preferred embodiment.

Figure 2:
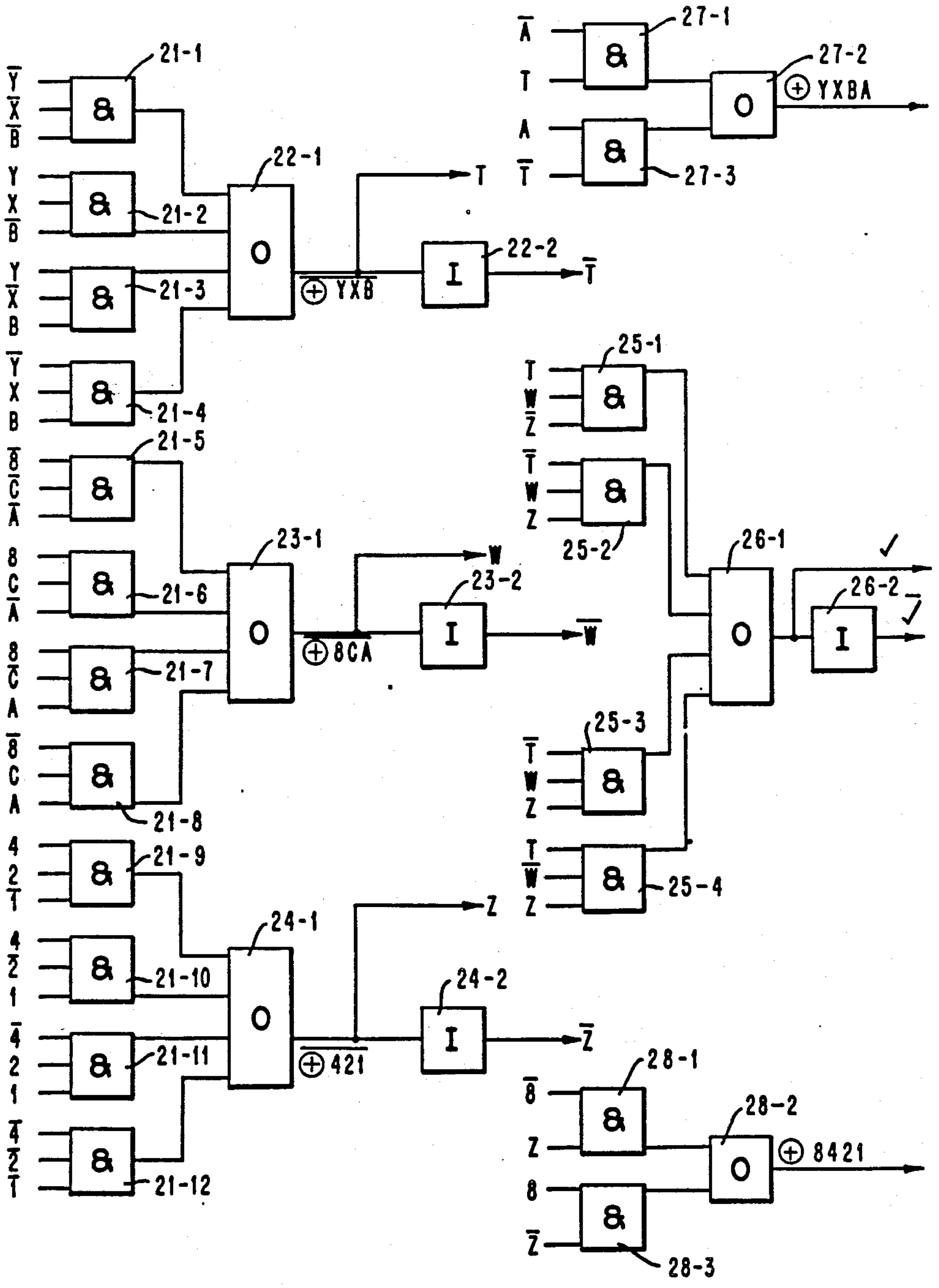

FIGURE 2 is a schematic block diagram of the code monitor which includes parity checker (√) Z and odd parity generator ⊕ 7 of FIGURE 1*b*.

*Summary—FIGURE 1a*

A tape unit or other bulk data storage device presents data via standard interface 1 on BCD data channels 8421 and parity channel C simultaneously. The effect of the parity channel is to cause the total number of bits in the data channels and the parity channel to be odd. Connected to interface 1 is a parity monitor. The parity monitor includes parity checker 2 which provides a signal CHECK (√) in the appropriate situation and a signal NO-CHECK ($\overline{\surd}$) in the error situation. Standard interface 1 also connects to BCD to 2/5 translator 3 (BCD—|>2/5). Translator 3 converts the signals presented to it by the data channels into a 2/5 character which passes via check gate 4 to buffer register 5. Buffer register 5 receives the 2/5 character for presentation to a computer memory or some other utilization device. Parity checker 2 signal CHECK (√) conditions check gate 4 for this function.

The BCD channels of no-check characters are passed directly to buffer register 5 via no-check gate 6 under control of parity checker 2 signal NO-CHECK ($\overline{\surd}$). The BCD channels provide inputs to odd parity generator 7 (⊕) of the parity monitor providing no-check gate 6 with an odd parity supplementary signal ⊕ so that the bit structure passing no-check gate 6 is 1/5, 3/5, or 5/5. Sum/modulo 2/symbol ⊕ indicates odd parity.

Buffer register 5 (BR), in the usual context, connects to a computer memory. During the course of computer operation, the memory will be read out onto a bus which contains a 2/5 validity checker. The computer will thus recognize the invalidity of a character known to have come from the data handling mechanism and can initiate a correction routine. The simplest correction routine is probably to print out the record in which the error character resides and to print out in detail the bit structure of the error character. The human operator then can thus analyze the error character by both bit structure and context.

*FIGURE 1b—Preferred embodiment*

The reading group available at standard interface 1 is eight data channels and an odd parity channel. The entire reading group is applied to the parity monitor which includes parity checker 2 and odd parity generator 7; the data portion is applied to code translator 3 and to no-check gates 4*a* and 4*b*. Parity checker 2 provides a signal CHECK (√) and a signal NO-CHECK ($\overline{\surd}$) as appropriate. Signal CHECK controls check gates 6*a* and 6*b*. If the reading group passes the parity check, the data portion is thus translated from BCD to 2/5 code by translator 3 and gated by check gates 6*a* and 6*b* to buffer register 5. Signal NO-CHECK controls no-check gates 4*a* and 4*b*. If the reading group fails the parity check, the data portion is gated by no-check gates 4*a* and 4*b* to buffer register 5.

Code translator 3 has two modes, alphameric and numeric. The alphameric mode code translation is from six-channel binary coded decimal (BCD) to two 2/5 code groups, since the machine which is to receive the data handles alphameric characters as two consecutive 2/5 coded numeric characters. In numeric mode the reading group signifies two BCD groups which are each translated directly into 2/5 groups. For an explanation of the alphameric and numeric mode and code groups see Bender and Galage, "Packing Mode Control," IBM Technical Disclosure Bulletin, vol. 4, No. 3, August 1961, pages 61–63.

If the reading group at the standard interface has incorrect parity, parity checker 2 provides signal NO-CHECK ($\overline{\surd}$) which operates no-check gates 4*a* and 4*b* to transfer the original bit structure of the reading group from standard interface 1 to buffer register 5. Since BCD code groups may contain 0, 1, 2, or 3 bits when correct (0–4 when incorrect), there is a possibility that the BCD bit pattern would exhibit 2/5 characteristics and thus be indetectable as error in the machine receiving it from buffer register 5. An odd parity bit, shown in the figure as the sum/modulo 2/symbol (⊕), is generated for each of the two digits of buffer register 5. Derivation of the sum/modulo 2/signal within the code monitor for each of the code groups YXBA and 8421 is by a very simple odd parity generar mechanism 7 associated with parity checker 2. These generated odd parity signals are impressed via no-check gates 4*a* and 4*b* onto buffer register 5.

The bit structures of the digits in buffer register 5 thus exhibit proper 2/5 characteristics for proper parity reading groups, and exhibit odd parity (which is an invalid 2/5 situation) for improper parity reading groups from standard interface 1.

*FIGURE 2—Code monitor parity checker*

Data channels 1, 2, 4, 8, A, B, X, Y and C and their respective complements are available from standard interface 1 of FIGURE 1*b*. The nine channels are divided into three groups of three channels each. Each group is divided into four sets, each set providing an even number of true inputs and an odd number of complement inputs to a receiving AND block 21. Four of these AND blocks 21–1 to 21–4 feed OR block 22–1 to provide an intermediate parity signal T and its complement $\overline{T}$. The four AND blocks of the group each respond to one of the four even parity conditions of three channels; not more than one AND block can be conditioned in each group. The T signal signifies that all of the sets applied to each of the AND blocks feeding its OR block have even parity and thus that the total number of bits applied to its group is even. AND blocks 21–1 to 21–4 and OR block 22—1 thus provide an "even" output signal T having significance $\overline{\oplus YXB}$ for channels YXB. Inverter 22–2 provides $\overline{T}$.

Similarly OR block 23—1 provides a W output when parity of set 8CA is even, $\overline{\oplus 8CA}$. Inverter 23–2 provides $\overline{W}$.

AND blocks 21–9 to 21–12 and OR block 24–1 provide the Z output when parity of set 421 is even, $\overline{\oplus 421}$. Inverter 24–2 provides $\overline{Z}$.

Intermediate signals T, W, and Z and their complements $\overline{T}$, $\overline{W}$, and $\overline{Z}$ are applied in sets of three to a group of AND blocks 25–1 to 25–4 which feed OR block 26–1. Each AND blocks 25–1 to 25–4 receives two of the even parity intermediate signals TWZ true and one complemented so that they each provide an odd parity output. The odd parity output passing through OR block 26–1 directly provides signal CHECK (√) and via inverter 26–2 makes NO-CHECK signal ($\overline{\surd}$).

*FIGURE 2—Code monitor parity generator*

Signal T indicates that the parity of data channels Y, X, B is even. To generate odd parity for group YXBA it is only necessary to combine data channel A with signal T on a parity basis. AND block 27–1 combines T and $\overline{A}$ to provide via OR block 27–2 signal $\oplus$YXBA. T is even; $\overline{A}$, representing the absence of the A bit, is even and thus $\overline{A}T$ is $\oplus$YXBA. Similarly in AND block 27–3, T is odd and A representing the A bit is odd. Therefore, $A\overline{T}$ is even.

Generation of signal $\oplus$8421 follows the same pattern. AND blocks 28–1 and OR block 28–2, or AND block 28–3 and OR block 28–2, respond to the $\overline{8}Z$ or $8\overline{Z}$ situations by producing signal $\oplus$8421.

The code monitor thus detects parity errors and provides gating control signals CHECK and NO-CHECK as appropriate. It also provides generated parity signals $\oplus$YXBA and $\oplus$8421 to NO-CHECK gates *4a* and *4b* for use when required.

*Components*

AND and OR blocks and registers are described in R. K. Richards, Arithmetic Operations in Digital Computers, Van Nostrand 1955, at pages 32 and 48. Codes and code translators are described by Richards in chapter 6 and also are the subject of Peterson, Error-Correcting Codes, MIT 1961, and cited references. The particular structure to be chosen for translator 3 is not a part of this patent application so long as it exhibits the desired characteristics. Gates are explained by Richards in chapter 3.

*Final summary*

The invention relates to data transmission with translation from a first to a second code. An incoming data reading group in the first code at standard interface 1 is applied to code monitor 2, 7, via code translator 3 to check gate 4 and directly to no-check gate 6. A control signal CHECK from the code monitor parity checker 2 operates check gate 4 to pass the translated reading group to buffer register 5. A control signal NO-CHECK from the code monitor parity checker 2 operates no-check gate 6 to pass the original bit structure to buffer register 5. Code monitor invalidity generator 7 produces a signal in response to the data reading group which renders the data reading group invalid in the second code.

Simple validity checks in the second code can thus isolate the reading group in error. The human operator can examine the original bit structure of the group.

While the invention has been particularly shown and described with reference to a preferred embodiment, it will be understood by those skilled in the art that various changes in form and details may be made without departing from the spirit and scope of the invention.

What is claimed is:

1. Data handling mechanism comprising:

(a) data input means for carrying sequential reading groups of data;

(b) code monitoring means connected to said data input means (a) for producing (1) a signal CHECK when the reading group satisfies code criteria, (2) a signal NO-CHECK when the reading group fails to satisfy code criteria, and (3) a parity signal representing the parity of a bit group within the reading group, (c) code translator means connected to said data input means;

(d) check means connected to said code translator means and to said code monitoring means, responsive to said code monitoring means signal CHECK to gate the reading group via said code translator to a utilization device; and (e) no-check means connected to said data input means and to said code monitoring means, responsive to said code monitoring means signal NO-CHECK to gate the reading group together with the parity signal to a utilization device.

2. Data handling mechanism comprising:

(a) data input means for carrying sequential reading groups of data;

(b) code monitoring means including (1) intermediate parity means for generating intermediate parity signals, (2) final parity means connecting to said intermediate parity means to produce final parity signals CHECK and NO-CHECK according to whether or not the reading group satisfies code criteria, and (3) second code invalidity generator means connected to said intermediate parity means and to said data input means to generate odd parity upon each bit group within the reading group;

(c) code translator means connected to said data input means;

(d) check gate means connected to said code translator means and to said code monitoring means, responsive to said code monitoring means signal CHECK to gate the reading group via said code translator to a utilization device.

3. A data handling mechanism comprising:

input means for receiving a first coded plural channel signal combination including a plural channel data signal in combination with a validity signal;

a translator responsive to said input means for translating from said first code to a second code, said second code characterized by the fact that only certain predetermined plural channel signal combinations represent valid characters in said second code;

a supplementary-signal generator responsive to said input means for generating a supplementary signal which, when combined with said plural channel data signal, comprises an invalid signal combination in said second code;

check means responsive to said input means for generating a check signal if said first coded combination is valid and a no-check signal if said first coded combination is invalid;

a check gate responsive to the output of said translator and said check means for gating the second coded signals to a utilization device upon the occurrence of a check signal; and a no-check gate responsive to said input means, said generated supplementary signal, and said check means, for gating said plural channel data signals and said generated supplementary signal to the utilization device upon the occurrence of a no-check signal.

No references cited.

MALCOLM A. MORRISON, *Primary Examiner.*